US012535136B2

(12) United States Patent
Koduri

(10) Patent No.: US 12,535,136 B2
(45) Date of Patent: Jan. 27, 2026

(54) BRAKE ASSEMBLY WITH BOOT ASSEMBLY

(71) Applicant: HL MANDO CORPORATION, Gyeonggi-do (KR)

(72) Inventor: Suresh Koduri, Novi, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 385 days.

(21) Appl. No.: 18/222,993

(22) Filed: Jul. 17, 2023

(65) Prior Publication Data

US 2025/0027563 A1 Jan. 23, 2025

(51) Int. Cl.
*F16J 3/04* (2006.01)
*F16D 65/00* (2006.01)
*F16D 125/08* (2012.01)

(52) U.S. Cl.
CPC ............ *F16J 3/042* (2013.01); *F16D 65/0025* (2013.01); *F16D 65/0087* (2013.01); *F16D 2125/08* (2013.01)

(58) Field of Classification Search
CPC .... F16F 65/0025; F16F 65/0087; F16F 65/18; F16F 2125/08; F16F 2125/40; F16J 3/042
See application file for complete search history.

(56) References Cited

U.S. PATENT DOCUMENTS

| 4,537,289 | A | | 8/1985 | VonGrünberg et al. |
| 5,829,557 | A | * | 11/1998 | Halasy-Wimmer ........................... B60T 13/741 188/162 |
| 6,000,507 | A | * | 12/1999 | Bohm ................. B60T 13/741 188/162 |
| 6,250,436 | B1 | * | 6/2001 | Oikawa ................ B60T 13/741 188/162 |
| 7,097,004 | B2 | | 8/2006 | Barrett et al. |
| 7,708,121 | B1 | | 5/2010 | Morais et al. |
| 11,193,547 | B2 | * | 12/2021 | Gerber .................... B60T 1/065 |
| 11,441,627 | B2 | * | 9/2022 | Hecker ................... B60T 1/065 |
| 11,512,750 | B2 | * | 11/2022 | Gerber ................... B60T 13/741 |
| 11,994,184 | B2 | * | 5/2024 | Koduri .................. F16D 65/183 |
| 2004/0226783 | A1 | | 11/2004 | Hall et al. |
| 2020/0224741 | A1 | * | 7/2020 | Hecker .................. F16D 65/84 |

(Continued)

FOREIGN PATENT DOCUMENTS

EP 0134521 A1 * 3/1985 ............. F16D 65/18

*Primary Examiner* — Thomas W Irvin
(74) *Attorney, Agent, or Firm* — WOMBLE BOND DICKINSON (US) LLP

(57) ABSTRACT

A boot assembly for a vehicle brake comprises: a flexible boot having an end portion coupled to a housing accommodating at least some components of the vehicle brake including a rotatable body configured to be rotatable by an actuator to move a brake pad and a bearing configured to rotatably support the rotatable body and comprising a non-rotatable bearing race, wherein the boot supports the non-rotatable bearing race; and a boot retainer configured to hold the boot in a fixed position with respect to the housing. Another end portion of the boot is coupled to a linearly movable body configured to be translatable according to rotation of the rotatable body of the vehicle brake to seal an inner bore of the housing. The boot is coupled with one side of the non-rotatable bearing race to limit an axial movement of the non-rotatable bearing race away from the housing.

17 Claims, 3 Drawing Sheets

(56) References Cited

U.S. PATENT DOCUMENTS

| | | | |
|---|---|---|---|
| 2023/0220896 A1* | 7/2023 | Koduri | F16D 65/18 |
| | | | 188/72.8 |
| 2025/0154994 A1* | 5/2025 | Strieter | F16D 55/226 |

* cited by examiner

BRAKE ASSEMBLY WITH BOOT ASSEMBLY

BACKGROUND

Various embodiments of the present disclosure generally relate to brake assemblies for a vehicle and more particularly to a brake assembly having a boot assembly which is capable of sealing a brake assembly housing as well as retaining a bearing assembly.

An electro-mechanical brake (EMB) is a brake assembly that is actuated by electrical energy. For example, the EMB system generally provides braking of a vehicle by the use of a motor which becomes selectively energized in response to a signal of an electronic control unit (ECU) or a sensed depression of a brake input means. Generally, the EMB system may include a rotor, a brake caliper, and brake pads on opposing sides of the rotor. The brake caliper is slidably supported on pins secured to an anchor bracket fixed to a non-rotatable component of the vehicle, and includes one or more piston bores, each of which houses a piston that is movable along a piston axis during a brake apply and release of the brake apply. The brake pads are connected to one or more electrically actuated pistons for movement between a non-braking position and a braking position where the brake pads are moved into frictional engagement with the opposed braking surfaces of the rotor. For example, when an operator of the vehicle depresses a brake pedal, an actuator can move the piston into contact with one brake pad and then move one brake pad into contact with one side of the rotor, while another opposing brake pad is moved into contact with an opposing side of the rotor.

By way of example and without limitation, such an EMB system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to some embodiments of the present disclosure, a boot assembly for a vehicle brake, the boot assembly may comprise: a flexible boot having an end portion coupled to a housing accommodating at least some components of the vehicle brake including a rotatable body configured to be rotatable by an actuator to move a brake pad and a bearing configured to rotatably support the rotatable body and comprising a non-rotatable bearing race, wherein the boot supports the non-rotatable bearing race; and a boot retainer configured to hold the boot in a fixed position with respect to the housing. The boot may be coupled with one side of the non-rotatable bearing race to limit an axial movement of the non-rotatable bearing race away from the housing. Another end portion of the boot may be coupled to a linearly movable body configured to be translatable according to rotation of the rotatable body of the vehicle brake to seal an inner bore of the housing.

The boot retainer may have material having higher rigidity than the boot. The boot retainer may have a substantially ring shape.

A part of the end portion of the boot and a part of the boot retainer may be seated within a groove recessed from a surface of the housing.

The end portion of the boot may be engaged with the non-rotatable bearing race, the housing, and the boot retainer.

The end portion of the boot may have a first arm disposed between the boot retainer and the housing.

The end portion of the boot may have a second arm disposed between the non-rotatable bearing race and the housing.

Both a part of the first arm of the end portion of the boot disposed between the boot retainer and the housing and a part of the second arm of the end portion of the boot disposed between the non-rotatable bearing race and the housing may be located within a groove recessed from a surface of the housing.

Each of the first arm of the end portion of the boot disposed between the boot retainer and the housing and the second arm of the end portion of the boot disposed between the non-rotatable bearing race and the housing may extend in opposite directions to each other.

A part of the end portion of the boot and a part of the boot retainer may be seated within a groove recessed from a surface of the housing, and a first part of the groove of the housing receiving the part of the end portion of the boot and a second part of the groove of the housing receiving the part of the boot retainer may be slanted or angled with respect to each other.

The end portion of the boot may have a third arm disposed between the non-rotatable bearing race and the boot retainer.

The third arm of the end portion of the boot may extend from a first arm disposed between the boot retainer and the housing, a second arm disposed between the non-rotatable bearing race and the housing, or a point between the first arm and second arm.

The third arm of the end portion of the boot may comprise one or more projections protruding toward the non-rotatable bearing race to support the non-rotatable bearing race.

The end portion of the boot may comprise a second arm fit into between the housing and a top surface of the non-rotatable bearing race for sealing an inside bore of the housing, and a third arm disposed between the boot retainer and a side surface of the non-rotatable bearing race such that the third arm of the end portion of the boot presses the non-rotatable bearing race toward the inside bore of the housing.

The end portion of the boot may comprise a fourth arm surrounding an edge of the boot retainer opposite to another edge of the boot retainer coupled to the housing.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
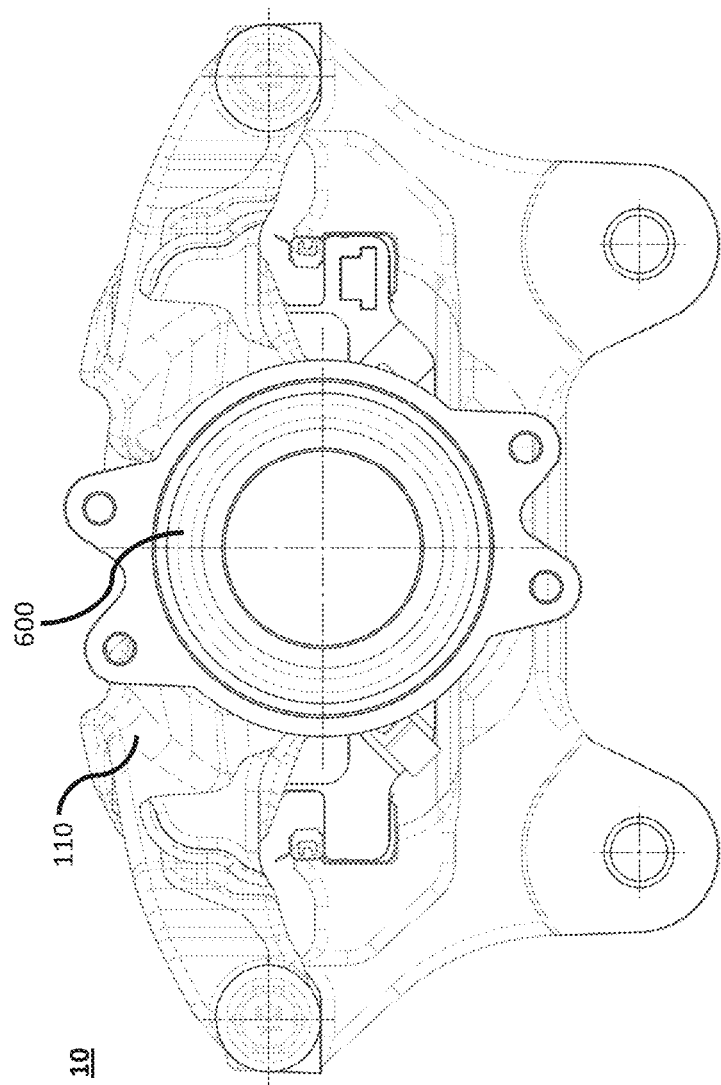
FIG. 1 is a rear view of a brake assembly according to an exemplary embodiment of the present disclosure.
Figure 2:
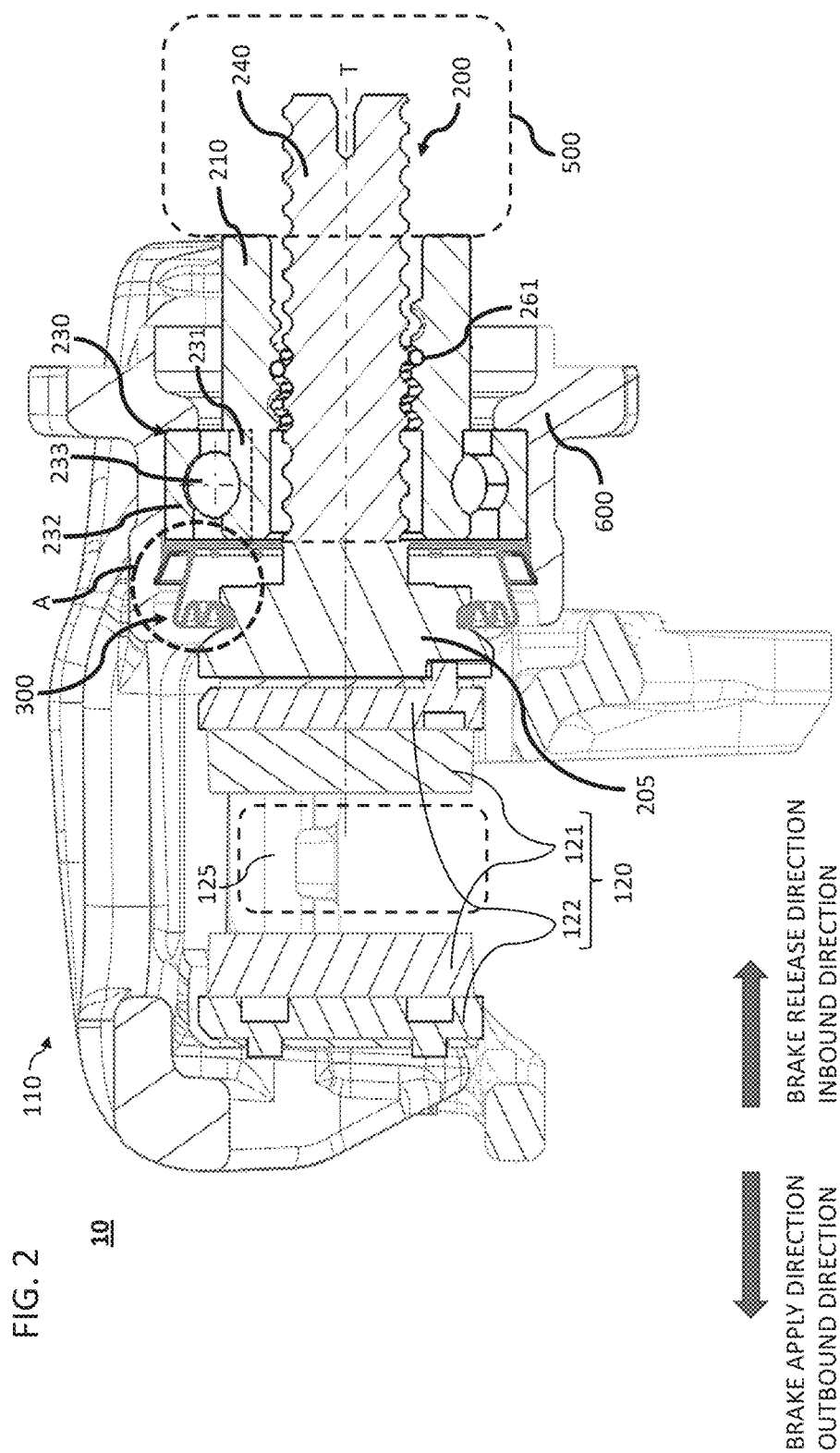
FIG. 2 is a cross-sectional view of a brake assembly according to an exemplary embodiment of the present disclosure.

FIG. 1 is a rear view of a brake assembly according to an exemplary embodiment of the present disclosure, and FIG. 2 is a cross-sectional view of a brake assembly according to an exemplary embodiment of the present disclosure.

Referring to FIGS. 1 and 2, a brake assembly 10 may include a brake caliper 110. The brake caliper 110 may be mounted in a floating manner by means of a brake carrier. The brake caliper 110 may be connected to any non-rotating or non-moving part of a vehicle. When the vehicle is in motion, a brake rotor 125 may rotate with a wheel about an axle of the vehicle. A brake pad assembly (or brake lining assembly) 120 is provided in the brake caliper 110, and includes a brake pad or lining 121 and a brake pad carrier (or a backing plate) 122. The brake caliper 110 may include a bridge with fingers, and the fingers of the brake caliper 110 may be in contact with the brake pad carrier 122. The brake pad 121 is disposed with a small air clearance on a side of the brake rotor 125, such as a brake disc, in a release position so that no significant residual drag moment occurs. The brake pad carrier 122 is disposed between the brake pad 121 and a piston or brake pad footing 205, the brake pad 121 and the brake pad carrier 122 of the brake assembly 120 move jointly together, and the movement of the brake pad carrier 122 causes the brake pad 121 to move with respect to the brake rotor 125.

The brake assembly 10 may comprise a drive mechanism 200 (e.g. a ball screw mechanism or a nut-screw mechanism) configured to convert rotary motion generated by an actuator assembly 500 into linear motion in order to move the brake pad assembly 120 toward or away from the brake rotor 125 in an axial direction.

The drive mechanism 200 may include a rotatable body 210 and a translatable body 240. For example, the rotatable body 210 may comprise a nut or a ball nut and the translatable body 240 may comprise a screw or a ball screw, although not required. The drive mechanism 200 may be contained within a housing 600. The rotatable body 210 and the translatable body 240 may be concentrically mounted in a cavity formed by an inner wall of the housing 600. The housing 600 may be fixedly coupled with the brake caliper 110.

The rotatable body 210 is operably coupled to the actuator assembly 500, and is configured to be rotatable by actuation of the actuator assembly 500 or force generated by the actuator assembly 500. For example, the rotatable body 210 is directly or indirectly coupled to the actuator assembly 500 through one or more gears and/or belts, any other connecting means and combination thereof. The actuator assembly 500 may comprise a motor fixedly mounted in the housing 600 or disposed outside the housing 600. Examples of the actuator assembly 500 and other parts of the brake assembly 10 are provided in U.S. patent application Ser. No. 17/575,628, entitled "BRAKE ASSEMBLY WITH TELESCOPIC MULTIPLE BALL SCREW MECHANISM", filed on Jan. 13, 2022, which is incorporated herein by reference in its entirety.

The actuator assembly 500 rotates the rotatable body 210 of the drive mechanism 200, and then the drive mechanism 200 converts the rotary motion of the rotatable body 210 to the linear motion of the piston or brake pad footing 205 to move the brake pad assembly 120 between its brake apply and release positions. For example, the actuation of the actuator 500 causes the rotatable body 210 to rotate, and the rotation of the rotatable body 210 causes the translatable body 240 to be linearly moved. Specifically, the rotatable body 210 can rotate relative to the housing 600, and the rotation of the rotatable body 210 relative to the housing 600 causes to the translatable body 240 advance or retract axially depending on a direction of rotation of the rotatable body 210. As the rotatable body 210 rotates in an expanding direction, the translatable body 240 linearly translates with respect to the rotatable body 210 and the housing 600 so that the translatable body 240 can translate out from the rotatable body 210 and the housing 600 towards the brake rotor 125. As the rotatable body 210 rotates in a collapsing direction, the translatable body 240 linearly translates with respect to the rotatable body 210 and the housing 600 so that the translatable body 240 can linearly move toward the rotatable body 210 and the housing 600 in a direction away from the brake rotor 125.

The piston or brake pad footing 205 is fixedly coupled to the translatable body 240 so that the piston or brake pad footing 205 can be linearly movable together with the translatable body 240. When the drive mechanism 200 is in the expanded state, the piston or brake pad footing 205 pushes the brake pad assembly 120 toward the brake rotor 125. When the drive mechanism 200 is in the collapsed state, the piston or brake pad footing 205 moves away from the brake rotor 125.

While the expanding or collapsing direction depends upon whether the nut or ball nut of the rotatable body 210 and the screw or ball screw of the translatable body 240 are left-handed or right-handed, a specific direction is not critical to some embodiments of the present disclosure, and most embodiments of the present disclosure can work with either.

The rotatable body 210 may have a tubular shape with axially open ends, and the translatable body 240 is received within an inside space of the rotatable body 210. The rotatable body 210 and the translatable body 240 are operably connected to each other such that while the rotatable body 210 rotates, the translatable body 240 is linearly movable relative to the rotatable body 210. In other words, the translatable body 240 is slidable with respect to the rotatable body 210, but the translatable body 240 cannot be rotatable relative to the rotatable body 210, and therefore as the rotatable body 210 rotates, the translatable body 240 is linearly moved. For example, the translatable body 240 has a structure configured to prevent the translatable body 240 from rotating relative to the rotatable body 210 while allowing the translatable body 240 to translate in the axial direction.

At least a part of the translatable body 240 is retained within the rotatable body 210. The rotatable body 210 has an internally-threaded track groove and the translatable body 240 has an externally-threaded track groove for a rollable body arrangement of rollable bodies 261 (e.g. balls). The rollable bodies 261 are disposed between the internally-threaded track groove of the rotatable body 210 and the externally-threaded track groove of the translatable body 240. Ball returns either internally or externally carry the rollable bodies 261 from the end of their path back to the beginning to complete their recirculating track. A return tube attached to or included in the rotatable body 210 can perform recirculation of the rollable bodies 261. The internally-threaded track groove of the rotatable body 210 and the externally-threaded track groove of the translatable body 240 form a series of ball tracks to provide a helical raceway for reception of a train of recirculating the rollable bodies 261. The rollable bodies 261 may be metal spheres which decrease friction and transfer loads between adjacent components. The rotatable body 210 is rotatably supported by the translatable body 240 via the rollable bodies 261 and a bearing assembly 230. However, in alternative embodiments of the present disclosure, the rotatable body 210 and the translatable body 240 can be directly engaged with each other without the rollable bodies 261.

The specific structures of the drive mechanism 120 described above and shown in FIG. 2 are exemplary embodiments for illustration purposes only. The present disclosure is not limited to these structures of the drive mechanism 120. Any drive mechanism having a rotatable body configured to be rotatable by the actuator assembly 500 and a linear movable body configured to be translatable according to the rotation of the rotatable body can be applied to some exemplary embodiments of the present disclosure.

Although FIG. 2 illustrates that the piston or brake pad footing 205 is a separate element from the translatable body 240 of the drive mechanism 200, the piston or brake pad footing 205 and the translatable body 240 of the drive mechanism 200 may be integrally formed as one single piece.

The bearing assembly 230 is configured to rotatably support the drive mechanism 200 for rotation of the rotatable body 210 of the drive mechanism 200 relative to a non-rotating structure of the brake assembly 10, for example, but not limited to, the housing 600. And, the bearing assembly 230 is configured to transfer the axial load of clamp force to the housing 600 to react. The bearing assembly 230 may be positioned between the rotatable body 210 of the screw mechanism 200 and the non-rotating structure or housing 600. The non-rotating structure or housing 600 may cover at least a part of the bearing assembly 230 such that the bearing assembly 230 can be seated in the non-rotating structure or housing 600.

The bearing assembly 230 may have a rotatable race 231 (e.g. an inner race), a non-rotatable race 232 (e.g. an outer race or ring), and a plurality of rollable bodies 233 (e.g., bearing balls). The bearing assembly 230 may include any number of rollable bodies 233, for example, more than four balls. The non-rotatable outer race 232 may be located concentrically about the rotatable inner race 231, with the rollable bodies 233 therebetween, in a plane generally perpendicular to a rotatable axis T of the rotatable body 210 of the drive mechanism 200 or the rotatable inner bearing race 231 or a translatable axis T of the translatable body 240 of the drive mechanism 200. Although FIG. 2 illustrates the rotatable inner bearing race 231 as a separate component from the rotatable part 210 of the drive mechanism 200 and the rotatable inner bearing race 231 is fixed to the rotatable part 210 of the drive mechanism 200, the rotatable inner bearing race 231 can be integrated with the rotatable part 210 of the drive mechanism 200 as one single piece, thereby providing a simpler assembly process and reducing manufacturing cost.

The rollable bodies 233 is configured to aid in rotation of the rotatable inner race 231 included in or fixed to the rotatable body 210 relative to the non-rotatable outer race or ring 232. The rollable bodies 233 are disposed in an annular cavity defined by the rotatable inner race 231 and the non-rotatable outer race 232, between the rotatable inner race 231 and the non-rotatable outer race 232. The rollable bodies 233 are supported within a bearing cage such that the rollable bodies 233 are appropriately circumferentially spaced and retained by the bearing cage. The bearing cage may be located between the rotatable inner race 231 and the non-rotatable outer race 232. In the exemplary embodiment of the present disclosure, the rollable bodies 233 may be spherical in shape, for example, but not limited to, balls.

The brake assembly 10 further comprises a flexible boot 300. The boot 300 can provide a seal interior to the housing 600 of the brake assembly 10 to prevent water, dirt, and other contaminants from entering into the inside of the housing 600 of the brake assembly 10 (for example, an inner bore formed by an inside wall of the housing 600) and contaminating the fluid or components contained inside the housing 600 of the brake assembly 10. The boot 300 can serve as a cover for enclosing the interior of the inner bore of the housing 600 of the brake assembly 10. A plurality of flexible convolutions may be provided in a main body 303 of the boot 300 between first and second ends 301 and 302 thereof. For instance, the main body 303 of the boot 300 can have accordion style overlapping folds that enable to expand and retract. The boot 300 may be formed from any suitable material. Preferably, the boot 300 is fabricated from a flexible material such as rubber, silicon, elastic, flexible plastic, polymer and the like so that the boot 300 can be movable, deformable, and/or pliable material without tearing or otherwise becoming damaged when a linearly movable component of the brake assembly 10 (e.g. the piston or brake pad footing 205 or the translatable body 240 of the drive mechanism 200) to which one end of the boot 300 is coupled moves. The boot 300 may prevent the linearly movable component of the brake assembly 10, to which one end of the boot 300, from rotating. In certain embodiments of the present disclosure, the boot 300 may be designed to function as a roll back seal to retract the linearly movable component of the brake assembly 10 toward the inside of the inner bore of the housing 600 when the brake is released.

The boot 300 may extend between the housing 600 of the brake assembly 10 and one of linearly movable components of the brake assembly 10 to provide an extensible and collapsible seal therebetween.

Figure 3:
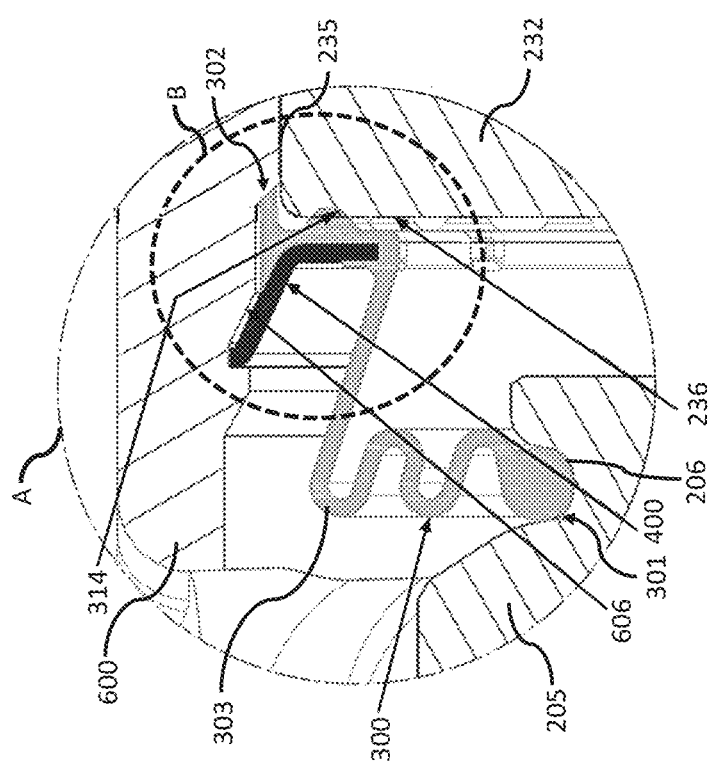
FIG. 3 is an enlarged view of a portion A in FIG. 2 according to an exemplary embodiment of the present disclosure.

The first end portion 301 of the boot 300 may be anchored to one of the linearly movable component of the brake assembly 10, such as the piston or brake pad footing 205 or the translatable body 240 of the ball-screw mechanism 200, in any suitable manner. For example, as illustrated in FIG. 3, the first end portion 301 of the boot 300 having a thicker ring than other portion of the boot 300 may be snapped in an annular groove 206 formed on an outer surface of the piston or brake pad footing 205 near an outboard end portion of the piston or brake pad footing 205. However, the first end portion 301 of the boot 300 can be coupled to any position at the piston or brake pad footing 205 or the translatable body 240 or any linearly movable component of the brake assembly 10 (for instance, but not limited to, the back plate 122 of the brake pad assembly 120) which is capable of appropriately sealing the interior of the housing 600 of the brake assembly 10. The first end portion 301 of the boot 300 is preferably provided with a shape which generally corresponds to the shape of the groove 206 formed on an outer surface of the piston or brake pad footing 205 or the translatable body 240. For example, the first end portion 301 of the boot 300 may have a shape of triangle, circle, square, or polygon in cross-section or any shape which can be disposed in the groove 206 of the piston or brake pad footing 205, and is adapted to engage or be disposed in the annular groove 206 formed on an outer side wall of the piston or brake pad footing 205.

The second end portion 302 of the boot 300 may be engaged with the housing 600 of the brake assembly 10 as well as the bearing assembly 230. The second end portion 302 of the boot 300 is anchored to the housing 600 to seal an inside bore of the housing 600 in which some components of the brake assembly 10 are disposed, and may support the bearing assembly 230 to secure the position of the bearing assembly 230 within the housing 600. For example, the second end portion 302 of the boot 300 is generally 'J' or 'T'-shaped in cross-section. The second end portion 302 may have one or more of three arms, a first arm 311 disposed between a boot retainer 400 and the housing 600, a second arm 312 disposed between the bearing assembly 230 and the housing 600, and a third arm 313 disposed between the boot retainer 400 and the bearing assembly 230. The first and second arms 311 and 312 of the second end portion 302 of the boot 300 are retained within a groove 605 formed on a surface of the housing 600. The groove 605 of the housing 600 may be recessed from an inner wall of the housing 600 to receive the first and second arms 311 and 312 of the second end portion 302 of the boot 300, and may be positioned adjacent to the bearing assembly 230.

The first arm 311 of the second end portion 302 of the boot 300 is inserted between the boot retainer 400 and the housing 600. The groove 605 of the housing 600 may have a first surface 606 engaged with the boot retainer 400 and a second surface 607 slanted or angled with respect to the first surface 606 and/or the boot retainer 400 to form a space between the boot retainer 400 and the second surface 607 of the groove 605 of the housing 600. The first arm 311 of the second end portion 302 of the boot 300 is fit in the space formed between the boot retainer 400 and the slanted surface 607 of the groove 605 of the housing 600. By having the first arm 311 of the second end portion 302 of the boot 300 between the boot retainer 400 and the housing 600, the second end portion 302 of the boot 300 can be firmly secured to the housing 600 by the boot retainer 400.

The second arm 312 of the second end portion 302 of the boot 300 is fit into between the housing 600 and the non-rotatable outer race 232 of the bearing assembly 230. The groove 605 of the housing 600 extends over at least part of the non-rotatable outer race 232 of the bearing assembly 230 to provide a space between a third surface 608 of the groove 605 of the housing 600 and the non-rotatable outer race 232 of the bearing assembly 230. The second arm 312 may enter or fill the space between the third surface 608 of the groove 605 of the housing 600 and the non-rotatable outer race 232 of the bearing assembly 230. By having the second arm 312 of the second end portion 302 of the boot 300 between the housing 600 and the non-rotatable outer race 232 of the bearing assembly 230, the second end portion 302 of the boot 300 can be secured to the housing 600 by being supported by at least one surface 235 of the boot retainer 400, such that at least one surface 235 (e.g. an upper surface) of the non-rotatable outer race 232 of the boot retainer 400 can prevent the second end portion 302 of the boot 300 from falling out from the groove 605 of the housing 600. The second arm 312 of the second end portion 302 of the boot 300 inserted between the housing 600 and the bearing assembly 230 can provide functions for sealing the inner bore of the housing 600.

Each of the first arm 311 positioned between the boot retainer 400 and the housing 600 and the second arm 312 disposed between the housing 600 and the bearing assembly 230 extends in directions generally opposite to each other to be securely anchored to the groove 605 of the housing 600 by the support of the boot retainer 400 and the non-rotatable outer race 232 of the bearing assembly 230.

The third arm 313 of the second end portion 302 of the boot 300 can be disposed between the bearing assembly 230 and the boot retainer 400. The third arm 313 may extend from the first arm 311, the second arm 312 or a point between the first arm 311 and the second arm 312 along between the non-rotatable outer bearing race 232 of the bearing assembly 230 and the boot retainer 400. For example, the third arm 313 of the second end portion 302 of the boot 300 may protrude from at or adjacent to a point located between the first arm 311 and the second arm 312 such that the second end portion 302 of the boot 300 can be stably and balancedly supported by the first arm 311 and the second arm 312, although not required.

The third arm 313 of the second end portion 302 of the boot 300 may have one or more projections 314 protruding from a surface of the third arm 313 facing the bearing assembly 230 toward the non-rotatable outer race 232 of the bearing assembly 230. The boot 300 may be made of any material that is capable of being deformed and returning to the original shape or form after being compressed or bent, for example, but not limited to, resilient or elastic material. Accordingly, the projection 314 of the third arm 313 of the second end portion 302 of the boot 300 can generate a restoring force the non-rotatable outer race 232 of the bearing assembly 230 (e.g. the brake release direction or the inboard direction of the vehicle). By these characteristics, the projection 314 of the third arm 313 of the second end portion 302 of the boot 300 is configured to force the non-rotatable bearing outer race 232 inward towards the inner bore of the housing 600 to retain the bearing assembly 230 in position within the housing 600. The projection 314 of the third arm 313 may counteract undesired outward axial movement of the non-rotatable bearing outer race 232 of the bearing assembly 230. For instance, the projection 314 of the third arm 313 can prevent the bearing assembly 230 from translating away from the inner bore of the housing 600 by any force which may be encountered during the brake apply operation (for instance, axially moving in the brake apply direction). The projection 314 of the third arm 313 may be squeezed between the boot retainer 400 and the non-rotatable bearing outer race 232 so that the projection 314 can press against a side surface 236 of the non-rotatable outer race 232 of the bearing assembly 230 in the inbound direction of the vehicle. Accordingly, the projection 314 of the third arm 313 of the second end portion 302 of the boot 300 can support the bearing assembly 230 within the housing 600 securely.

The second end portion 302 of the boot 300 may further include a fourth arm 315 surrounding an inner edge of the boot retainer 400 located to an outer edge of the boot retainer 400 seated within the groove 605 of the housing 600. For instance, the fourth arm 315 of the second end portion 302 of the boot 300 extends outwardly to form a recess (e.g. a letter 'U'-like shaped groove) by side walls of the third and fourth arms 313 and 315, and the inner edge of the boot retainer 400 is disposed in the recess. Accordingly, by having the fourth arm 315 surrounding the inner edge of the boot retainer 400, the second end portion 302 of the boot 300 and the boot retainer 400 can be firmly coupled to each other.

The boot retainer 400 may be placed over the boot 300 to retain or hold the boot 300 in place. The boot retainer 400 clamps the boot 300 onto the housing 600 and the non-rotatable race 232 of the bearing assembly 230. The boot retainer 400 helps to secure the second end portion 302 of the boot 300 within the groove 605 of the housing 600 and provides support on the third arm 313 of the boot 300 for pressing against the non-rotatable outer race 232 of the bearing assembly 230. Accordingly, the boot retainer 400 stops the boot 300 and the bearing assembly 230 from exiting. And, the boot retainer 400 can limit the axial translation of the second end portion 302 of the boot 300 and the bearing assembly 230 to restrict or prevent the boot 300 and the bearing assembly 230 from moving axially outward and disengaging from the housing 600.

Figure 4:
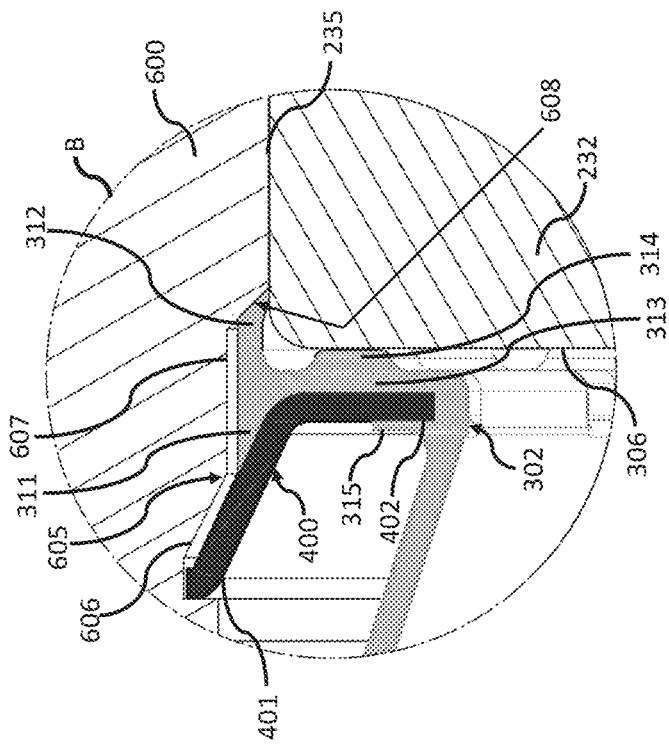
FIG. 4 is an enlarged view of a portion B in FIG. 3 according to an exemplary embodiment of the present disclosure.

The boot retainer 400 may be secured to the housing 600 in any suitable manner. For instance, the boot retainer 400 may be snap-fitted in an annular groove formed on the housing 600. In the exemplary embodiment shown in FIGS. 3 and 4, the outer edge of the boot retainer 400 may seat within the groove 605 of the housing 600 together with the second end portion 302 of the boot 300. The boot retainer 400 may be a snap ring having a ring shape with an opening through which the boot 300 passes. The boot retainer 400 has a first portion 401 seating within the groove 605 defined by the housing 600 to be securely coupled to the housing 600 and a second portion 602 disposed on the first and third arms 311 and 313 of the second end portion 310 of the boot 300 to secure the first and second arm 311 and 312 of the second end 310 of the boot 300 in place for performing the seal of the housing 600 and to provide support on the third arm 313 of the second end portion 310 of the boot 300 for helping the third arm 313 of the boot 300 to prevent the bearing assembly 230 from translating away from the inner bore of the housing 600. A part of the first portion 401 of the boot retainer 400 coupled to the housing 600 and a part of the second portion 402 of the boot retainer 400 engaging the second end portion 310 of the boot 300 are slanted or angled relative to each other so that the first portion 401 of the boot retainer 400 can be firmly secured within the groove 605 of the housing 600 and the second portion 402 of the boot retainer 400 securely supports the second end portion 310 of the boot 300 as well as the non-rotatable bearing outer race 232.

The boot retainer 400 may be formed from material having higher rigidity than the boot 300 such that the boot retainer 400 can firmly support the boot 300 and withstand forces caused by the deformation of the boot 300 or the axial movement of the bearing assembly 230. The boot retainer 400 may be formed of, for example, but not limited to, metal, such as steel or aluminum. Accordingly, the boot retainer 400 may be formed from a relatively rigid material and the boot 300 may be formed from a relatively soft flexible elastomeric material.

The boot retainer 400 may be formed or molded separately from the boot 300 and placed on the boot 300 during assembly. Alternatively, the boot retainer 400 can be integrated into the second end portion 310 of the boot 300 in a one-piece design by molding. For instance, the boot 300 may be over-molded around the boot retainer 400.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A boot assembly for a vehicle brake, the boot assembly comprising:
   a flexible boot having an end portion coupled to a housing accommodating at least some components of the vehicle brake including a rotatable body configured to be rotatable by an actuator to move a brake pad and a bearing configured to rotatably support the rotatable body and comprising a non-rotatable bearing race, wherein the boot supports the non-rotatable bearing race; and
   a boot retainer configured to hold the boot in a fixed position with respect to the housing.

2. The boot assembly for the vehicle brake of claim 1, wherein the boot is coupled with one side of the non-rotatable bearing race to limit an axial movement of the non-rotatable bearing race away from the housing.

3. The boot assembly for the vehicle brake of claim 1, wherein the boot retainer has material having higher rigidity than the boot.

4. The boot assembly for the vehicle brake of claim 1, wherein the boot retainer has a substantially ring shape.

5. The boot assembly for the vehicle brake of claim 1, wherein a part of the end portion of the boot and a part of the boot retainer are seated within a groove recessed from a surface of the housing.

6. The boot assembly for the vehicle brake of claim 1, wherein the end portion of the boot is engaged with the non-rotatable bearing race, the housing, and the boot retainer.

7. The boot assembly for the vehicle brake of claim 1, wherein another end portion of the boot is coupled to a linearly movable body configured to be translatable according to rotation of the rotatable body of the vehicle brake to seal an inner bore of the housing.

8. The boot assembly for the vehicle brake of claim 1, wherein the end portion of the boot has a first arm disposed between the boot retainer and the housing.

9. The boot assembly for the vehicle brake of claim 1, wherein the end portion of the boot has a second arm disposed between the non-rotatable bearing race and the housing.

10. The boot assembly for the vehicle brake of claim 1, wherein the end portion of the boot has first and second arms, and both a part of the first arm of the end portion of the boot disposed between the boot retainer and the housing and a part of the second arm of the end portion of the boot disposed between the non-rotatable bearing race and the housing are located within a groove recessed from a surface of the housing.

11. The boot assembly for the vehicle brake of claim 10, wherein each of the first arm of the end portion of the boot disposed between the boot retainer and the housing and the second arm of the end portion of the boot disposed between the non-rotatable bearing race and the housing extends in opposite directions to each other.

12. The boot assembly for the vehicle brake of claim 1, wherein a part of the end portion of the boot and a part of the boot retainer are seated within a groove recessed from a surface of the housing, and a first part of the groove of the housing receiving the part of the end portion of the boot and a second part of the groove of the housing receiving the part of the boot retainer are slanted or angled with respect to each other.

13. The boot assembly for the vehicle brake of claim 1, wherein the end portion of the boot has a third arm disposed between the non-rotatable bearing race and the boot retainer.

14. The boot assembly for the vehicle brake of claim 13, wherein the third arm of the end portion of the boot extends from a first arm disposed between the boot retainer and the housing, a second arm disposed between the non-rotatable bearing race and the housing, or a point between the first arm and second arm.

15. The boot assembly for the vehicle brake of claim 13, wherein the third arm of the end portion of the boot comprises one or more projections protruding toward the non-rotatable bearing race to support the non-rotatable bearing race.

16. The boot assembly for the vehicle brake of claim 1, wherein the end portion of the boot comprises a second arm fit into between the housing and a top surface of the non-rotatable bearing race for sealing an inside bore of the housing, and a third arm disposed between the boot retainer and a side surface of the non-rotatable bearing race such that the third arm of the end portion of the boot presses the non-rotatable bearing race toward the inside bore of the housing.

17. The boot assembly for the vehicle brake of claim 1, wherein the end portion of the boot comprises a fourth arm surrounding an edge of the boot retainer opposite to another edge of the boot retainer coupled to the housing.

* * * * *